United States Patent [19]

Burnham

[11] 4,118,817

[45] Oct. 10, 1978

[54] TELESCOPIC TOW GUARD FOR A DOCK BOARD

[75] Inventor: Peter B. Burnham, Columbus, Ohio

[73] Assignee: Harsco Corporation, Wormleysburg, Pa.

[21] Appl. No.: 842,082

[22] Filed: Oct. 14, 1977

[51] Int. Cl.² ............................................... E01D 1/00
[52] U.S. Cl. ..................................................... 14/71.3
[58] Field of Search .................. 14/69.5, 71.3, 71.1, 14/71.7

[56] References Cited

U.S. PATENT DOCUMENTS

| | | | |
|---|---|---|---|
| 2,846,703 | 8/1958 | Adley | 14/71.7 |
| 3,255,478 | 6/1966 | Lambert | 14/71.7 |
| 3,363,273 | 1/1968 | Chitwood | 14/71.7 |
| 3,456,274 | 7/1969 | McGuire | 14/71.7 |
| 3,886,615 | 6/1975 | Metro | 14/71.3 |

*Primary Examiner*—Nile C. Byers
*Attorney, Agent, or Firm*—Cameron, Kerkam, Sutton, Stowell & Stowell

[57] ABSTRACT

A toe guard is provided for a pivotable dock board in which the toe guard includes two relatively telescopically mounted plates for increasing the vertical height of protection at each side of the dock board. A dock board to which the present invention is applicable includes a ramp that is designed for pivoted mounting in a pit formed in a loading dock. This ramp includes an upper transport plate which alternatively forms a contiguous surface portion of the dock or may be pivoted to a relatively depressed or relatively elevated position with respect to the dock to permit transfer and transport of persons and equipment between the dock and an adjacently positioned vehicle. The sides of the ramp form an exposed area when the ramp is elevated with respect to the dock and toe guards are provided to prevent injury to personnel who may be standing closely adjacent to the dock and may inadvertently place their feet into the operating space of the ramp and possibly result in personal injury. The toe guard of this invention includes two or more telescopic plates which are relatively pivoted to each other for relative swinging movement in the same plane with the one plate pivoted to the ramp of the dock board structure to be pivoted in conjunction with the dock board for extending the plates to the fullest extended position on upward swinging of the ramp and telescoping to a collapsed position on downward swinging of the ramp.

11 Claims, 5 Drawing Figures

TELESCOPIC TOW GUARD FOR A DOCK BOARD

BACKGROUND OF THE INVENTION

A safety problem is associated with the elevating type dock boards that are widely utilized to adapt a fixed elevation dock surface to the different height loading surfaces of trucks or railroad cars, include a ramp which is mounted in a pit formed in the dock area for vertical swinging movement. Such a ramp comprises a rigid frame having an upper surface or transport plate across which persons and transport vehicles such as forklifts may be moved for carrying of goods. To accommodate the dock boards to the various height of vehicles with comparison to the dock, this ramp is pivoted for swinging movement in a vertical plane to various inclined positions. It is necessary that the ramp be capable of being pivoted to a relatively downwardly inclined or depressed position with respect to the dock and the ramp as well as swing to a substantially elevated position with respect to a coplanar position relative to the dock surface. The problem with the basic constructional feature of a supporting frame for the ramp which is pivoted into and out of the pit area, is that this frame structure can result in injury to persons who may be standing adjacent to the dock and inadvertently place their feet into the space through which the structural frame members of the ramp pivot during the indicated movements.

Attempts have been made to provide an effective toe guard which can be positioned in association with the ramp of the dock board and provide the necessary protection to prevent insertion of a person's foot into the operating area of the ramp. An example, of such a prior device, is that illustrated in Pat. No. 3,886,615 issued to Robert D. Metro on June 3, 1975. That patent discloses a dock board of the generally utilized type and includes the provision of vertically disposed plates which perform a function in protecting a person's foot by closing at least a portion of the space which would otherwise be open at each side of the ramp when the ramp is in a relatively upwardly pivoted position with respect to the surface of the adjoining areas of the dock. The toe guard disclosed in that patent comprises a single plate which is pivoted for vertical swinging movement about the same axis as the ramp pivot axis and, when the ramp is closed or moved to a depressed position, the toe guard plate is merely supported on the adjacent edge portions of the dock. This permits the ramp to be able to move through its entire vertical pivoting extent as intended for its designed operation.

As indicated in that patent, the problem in obtaining the optimum and best protection for persons is the substantial extent of vertical swinging of a dock board in comparison to the vertical dimensions of the pit in which such a dock board is mounted. Generally the pit area is relatively shallow as most dock boards of this type are designed and fabricated to have a minimum vertical extent for reasons of economy and to facilitate installation in existing dock areas. Consequently, a protective toe guard plate is limited to a fixed or maximum vertical dimension which is determined by the available storage height that exists in the pit area for the dock board. Therefore, since most dock boards are capable of a vertical swinging movement at their outer ends that is essentially greater than the vertical height of the pit, a single protective toe guard plate is incapable of providing protection when the ramp is swung to its uppermost position.

SUMMARY OF THE INVENTION

This invention provides a toe guard which is capable of adapting to a dock board having an upwardly swinging ramp wherein the vertical extent of the upward movement of that ramp is substantially greater than the depth of the pit in which the dock board is mounted. This toe guard comprises a pair of plates which are secured in relatively pivoted relationship and mounted for cooperative swinging movement in a vertical plane. One of the plates is pivoted onto the ramp and is provided with mechanically coupling means that cooperates with the ramp for swinging of the ramp in an upward direction. That coupling means is disengageable upon downward swinging of the ramp to a relatively depressed position with respect to the dock surface whereupon the one plate is then supported by the dock.

In accordance with this invention, the second plate of the toe guard is pivoted onto the first plate for swinging movement in coplanar relationship thereto and is carried by the first plate when it is swung to an upwardly extended position. The second and first plate are provided with respective mechanical coupling means to produce the upward swinging movement in cooperation with the swinging of the first plate and to permit the relative telescoping of the two plates when the ramp is swung to either a stored position in coplanar relationship with the dock surface or swung to a relatively lower angular position where the ramp surface is depressed to a downwardly inclined position.

The provision of the two telescopic plates enables the toe guard to cover a much greater vertical extent of space for a predetermined vertical height or storage dimension that is available within a relatively shallow pit for the mounting of the dock board. The angular swinging of the ramp results in a substantial angular distance at the end thereof remote to its point of pivoting which results in a relatively larger vertical dimension then is customarily available in a pit for such dock boards. The telescopic plates forming the toe guard thus accommodate and are capable of expanding to a substantially greater height or vertical dimension at the outer end of the ramp and thus enable the toe guard of this invention to completely close the sides of the dock board when it is in a fully raised position.

The operation and actuating of the telescopic plates is automatic and in accordance with the mechanical movement of the ramp thus requiring no additional components or actuating devices. The ability of the telescopic plates to relatively collapse results in a requirement for a minimal vertical storage height in the pit area.

The pit in which the dock board is to be installed is formed with side edges at the surface of the dock normally contiguous with the ramp surface when in a horizontal position. These side edges are provided with reinforcing angles supported to provide a shallow recess at the edge of the dock and extending along the side of the dockboard. Each toe guard has the first plate formed with a laterally outward projecting flange at its upper edge and which is adapted to fit into the adjacent edge recess in a manner so as to be flush with the surface of the dock thereby avoiding forming any obstruction that would project upwardly and present a safety hazard to either person or transport vehicles. This interengagement of the toe guard plate flange and reinforcing angles provides support for the plate in its lower position.

These and other objects and advantages of this invention will be readily apparent from the following detailed description of an illustrative embodiment thereof and the accompanying drawings.

DESCRIPTION OF THE DRAWING FIGURES

DESCRIPTION OF THE ILLUSTRATED EMBODIMENT

Figure 1:
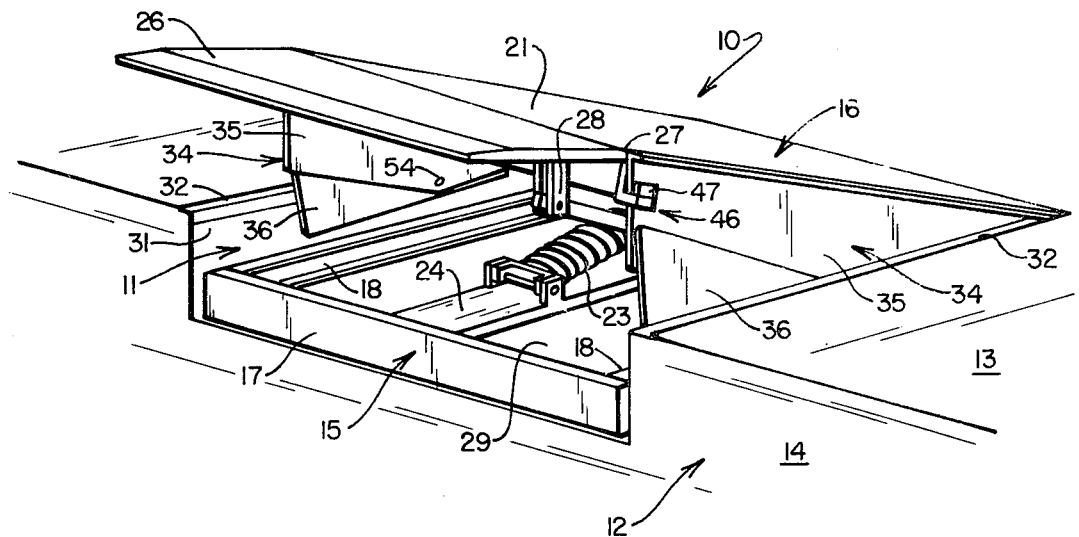
FIG. 1 is a perspective view of a dock board provided with a toe guard of this invention and pivoted to an upwardly extended position.

Having reference to the drawings, specifically FIG. 1, a dock board 10 is shown mounted in a pit 11 formed in a dock 12. The dock 12, may be associated with a building structure such as a warehouse or transfer terminal and includes a horizontal dock surface 13 which extends in surrounding relationship to the pit 11. The dock 12 terminates at a vertical edge surface 14 which extends downwardly to a surface on which the transporting vehicles are maneuvered or backed up to the dock 12. Accordingly, the height of the dock surface 13 is determined in accordance with the average height of the cargo bed of the usual type of vehicle which will be serviced by a particular dock. Since this elevation can only be an average height, it will be readily apparent that other vehicles may have a different height cargo bed and it would be difficult to provide a ramp for interconnecting the dock surface with the vehicle platform in many instances. Accordingly, a dock board 10 of the illustrated type is often provided and includes a ramp which can be pivoted in a vertical plane to either an upwardly or downwardly inclined position to provide a surface across which persons and load handling equipment may be readily maneuvered as between the dock and the vehicle.

Figure 2:
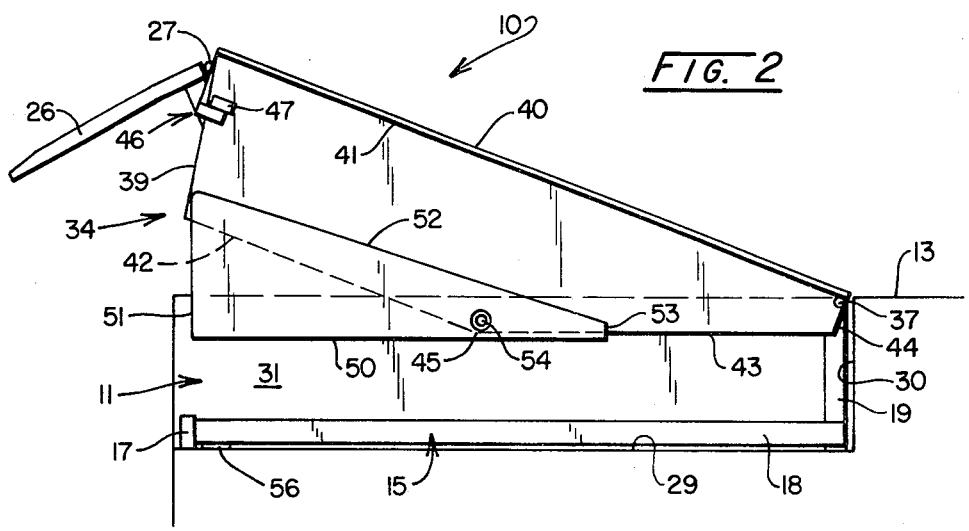
FIG. 2 is a side elevational view of the dock board displaced to this upwardly extended position.
Figure 3:
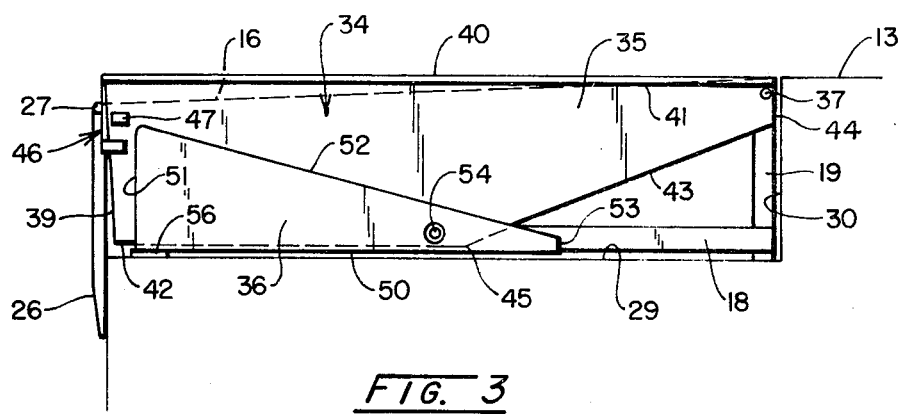
FIG. 3 is a side elevational view of the dock board pivoted to a horizontal stored position.

The dock board 10, illustrated in FIG. 1, comprises a basic portion of a type which is of well known construction for such apparatus. Specifically, this dock board includes a base frame 15 on which a ramp 16 is mounted for relative swinging movement in a vertical plane. The base frame 15, as illustrated in FIG. 1, is formed from several structural steel members which may be C-shaped channels and include a front element 17 and the two longitudinally extending elements 18 with these elements adapted to being secured to the bottom surface of the pit 11. A pair of vertical struts 10 are secured to the rearward ends of the longitudinal elements and carry a hinge mechanism at their upper ends for coupling with the ramp 16. Referring to FIGS. 2 and 3, it will be seen that the base frame 15 thus extends toward the rear of the pit 11 and thus maintains the one end of the ramp 16 at a position to align with the dock surface 13 regardless of the pivoted position to which the ramp may be swung at any particular time.

Forming the ramp 16 is a structural frame 20 which is of substantially rectangular configuration and of a size to essentially fill the open space of the pit 11. Secured to the upper surfaces of the structural frame elements 20 is a flat plate 21 which forms the ramp or transport surface. Pivotal mounting of the ramp 16 to the vertical struts 19 is effected by sets of hinge pins 22 which extend through cooperating brackets of the frame elements 20 and the upper ends of the struts 19.

Apparatus and mechanisms for effecting the upward swinging of the ramp 16 and controlling the movement thereof is provided interiorally of the dock board structure as can be best seen in FIG. 1. This apparatus includes a counterbalancing spring 23 which has one end secured to a mounting bracket 24 incorporated in the base frame 15. The opposite end of this spring is connected to the ramp 16 and provides a force for assisting in the elevating of the ramp. Control mechanisms are provided but are not illustrated in the drawings for effecting the positioning of the ramp at a desired elevation whether raised, as shown in FIG. 1 or inclined downwardly within the interior of the pit 11. Such components of a control mechanism are not illustrated as these mechanisms do not form a part of this invention and are well known to those having knowledge of dockboard apparatus.

Figure 4:
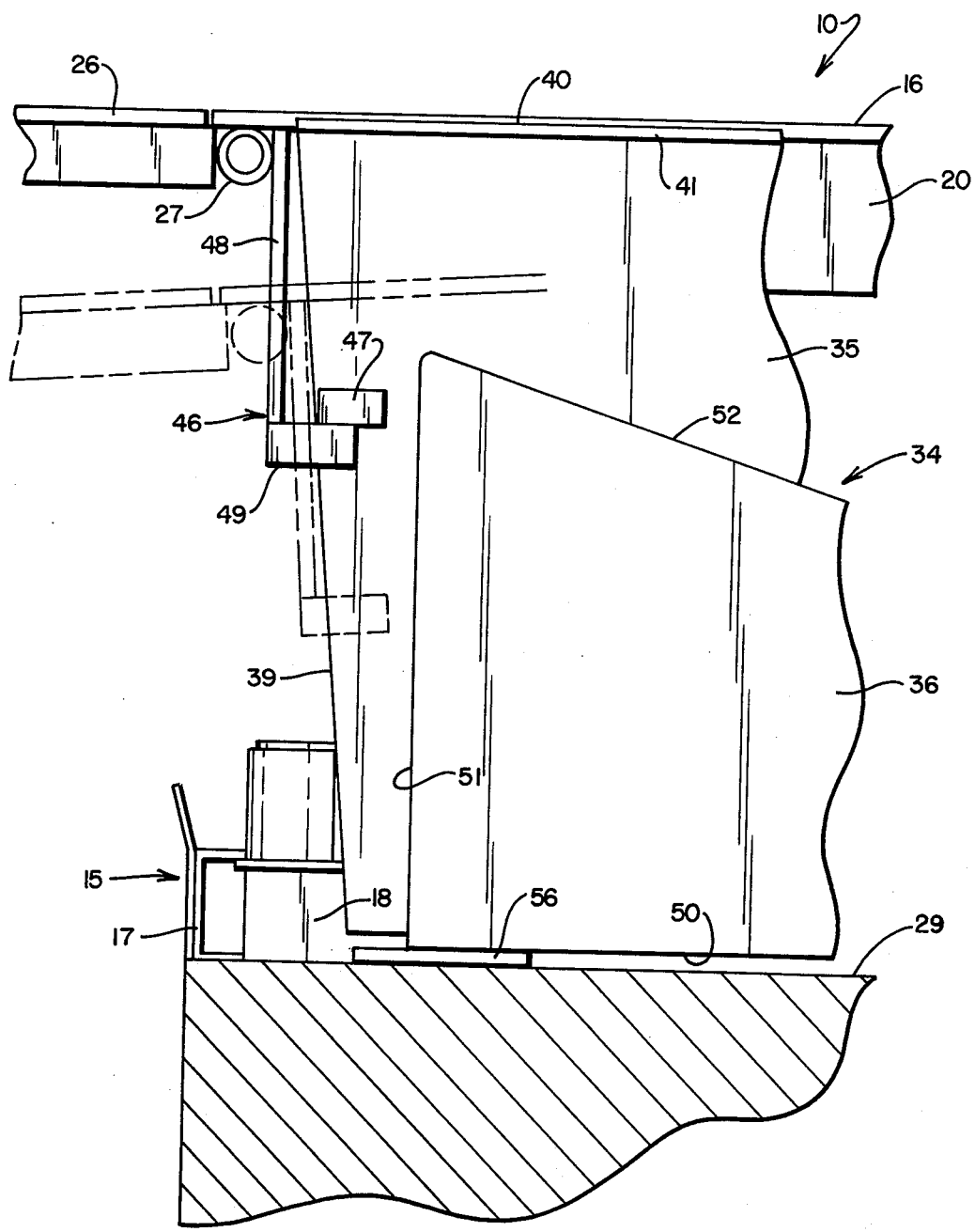
FIG. 4 is a fragmentary side elevational view on a substantially enlarged scale of the forward end portions of the dock board and toe guard.

An extendible lip 26 is also customarily provided in a dockboard of this type and is pivotally mounted on the forward or leading end of the ramp 16 by a hinge mechanism 27 as shown in FIG. 4. This lip is capable of being pivoted from a depending vertical position of FIG. 3 to the illustrated horizontally extending position of FIG. 1. The purpose of the lip 26 is to provide a bridge between the ramp surface 21 and the carrying or cargo surface of a vehicle which is positioned adjacent to the dock 12. Certain components 28 of the control and actuating mechanism are interconnected between the ramp 16 and the lip 26 to effect the automatic upward swinging movement thereof to the indicated extended positions of FIGS. 1 and 2.

The pit 11 includes a bottom surface 29, a rear wall 30 with spaced apart longitudinally extending side walls 31 which extend upwardly from the bottom surface 29. The pit is thus open at the front or edge surface 14 of the dock and the side walls are spaced apart a distance to receive the ramp 16 therebetween. Each of the corners at the upper ends of the side walls 31 of the pit are provided with protective angle members 32 to provide protection as to the dock 12 which may be fabricated from concrete or wood members. These protective angle members 32 extend along each side wall of the pit 11 to maintain a sharply defined edge of the pit area. In accordance with this invention, for cooperation with the toe guards that are provided, the angle members 32 extend longitudinally at the top of the side walls 31, are preferably recessed a distance below the surface 13 of the dock with the one flange 32a vertically disposed. The recess is of sufficient vertical extent greater than the thickness of cooperative components of the toe guard to fully receive those components to prevent any portions thereof from projecting above the dock surface 13 or ramp 16 and, to provide further protection, the horizontally extending flange 32b of each of these angle members is provided with a spacer plate 33. This spacer plate 33 which is of a thickness slightly greater than that of the cooperative components of the toe guard is of lessor width than the flange 32b and extends along the angle member to provide further protection as to the dock structure immediately adjacent the pit.

Figure 5:
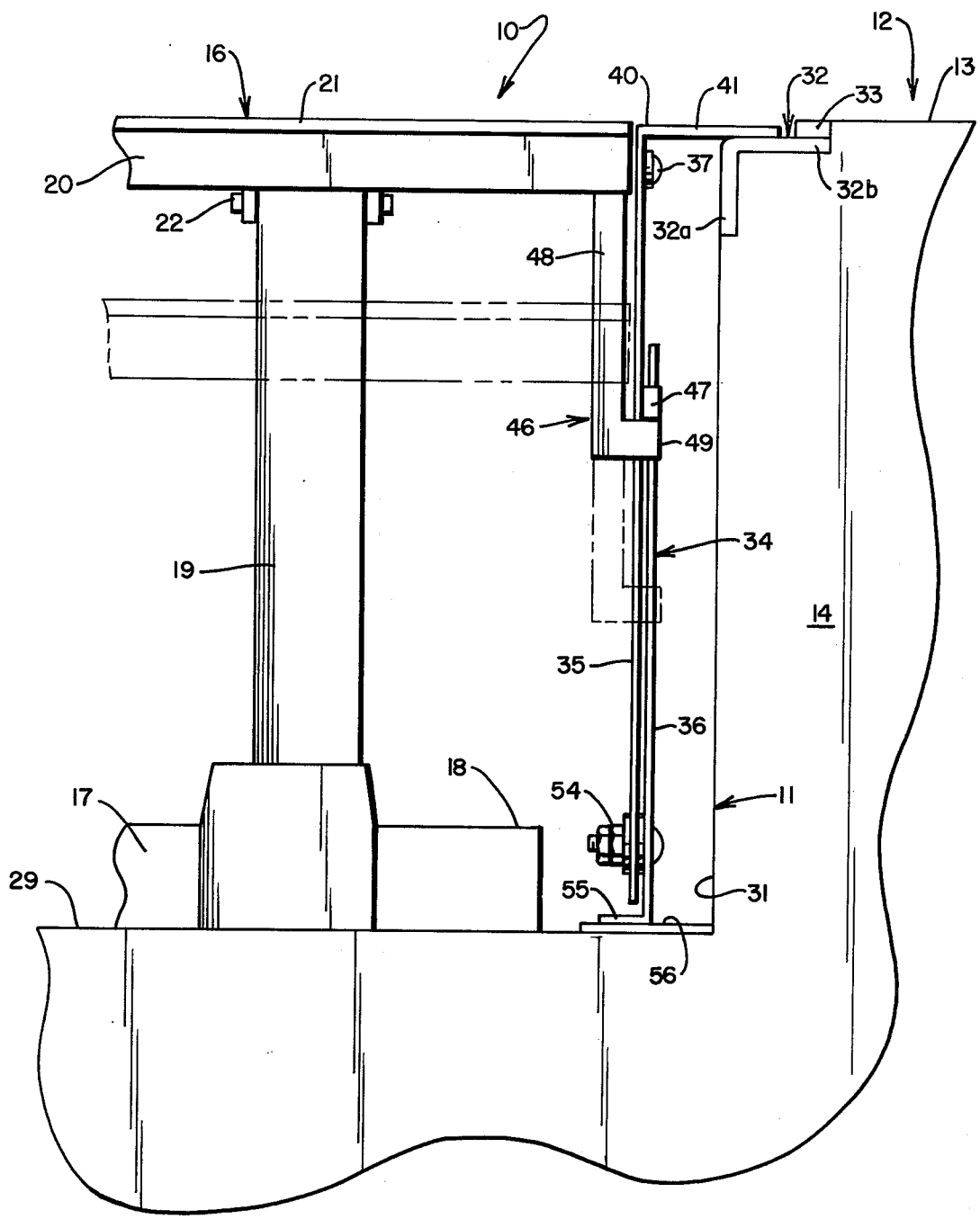
FIG. 5 is a fragmentary front elevational view on a substantially enlarged scale of a side portion of the dock board, toe guard and associated mounting pit.

Forming the toe guard 34 of this invention are two elongated plates 35 and 36 fabricated from sheet steel which are vertically disposed in a parallel relationship and are supported at each longitudinal side of the ramp 16. The one plate 35 which is defined as the primary or main plate, is secured at one end by a hinge pivot 37 to a longitudinally extending channel 38 of the ramp frame 20. This hinge pivot 37 is located closely adjacent the hinge axis of the ramp, and may be aligned therewith, and secures the plate 36 for relative swinging movement in a vertical plane with respect to the ramp 16. This plate 35 is of a length to extend substantially the full length of the ramp and terminates in a vertically extending forward edge 39 which is nearly perpendicular to the plane of the ramp 16. An upper longitudinally extending edge 40 of the plate 35 is provided with a laterally outward extending flange 41 which projects a distance to extend over the adjacent flange 32b of the angle member 32, as can be best seen in FIG. 5, where it is protected by its recessed relationship to the spacer 33 and dock surface 13 from damage that could result from operation of equipment such as forklifts. Accordingly, this plate 35 is relatively free for pivoting movement with respect to the ramp 16 and will be maintained in an illustrated position as shown in FIG. 5 when the ramp is swung to either a horizontal position as shown in FIG. 3 or to a downwardly inclined position.

The lower marginal edge portion of the plate 35 includes a first edge portion 42 which extends rearwardly from the forward edge 39 in a generally parallel relationship to the flange 41 at the upper edge 40 of the plate. This parallel edge portion 42 terminates at approximately the longitudinal mid-point of the plate with the remaining lower edge portion including a second edge portion 43 which is angled in convergent relationship to the upper edge 40 at the top of the plate. Accordingly, the edge 43 extends to a closely adjacent position adjacent the upper edge 40 in the vicinity of the pivot 37 where it terminates in a vertical rear edge 44. The longitudinal mid-point of the edge portions 42 and 43 is indicated by the numeral 45.

Referring to FIG. 3 where the ramp 16 is shown positioned in a normal horizontal position, it will be seen that the toe guard plate 35 is supported to be fully enclosed within the pit 11 and does not form any obstruction to movement of persons or load handling equipment, along the dock surface 13. In FIG. 3, it will be noted that the maximum vertical height, of the plate 35, as represented by the vertical dimension between the edges 40 and 42 is nearly equal to the vertical height of the side walls 31 of the pit 11. Referring to FIG. 2, it will be seen that the ramp 16 is pivoted to a substantially elevated position, which maximum elevated position is attained during the operation of the ramp and necessary for extension of the lip 26 through concurrent upward swinging movement in the process of placing that lip onto the load or cargo surface of a vehicle. When the ramp 16 is thus positioned as shown in FIG. 2, it will be seen that the plate 35 has an insufficient vertical dimension at the portions thereof adjacent the forward edge 39 to close the space that is formed at the side of the dockboard between the ramp 16 and the dock surface 13. A substantial space will remain between edge portion 42 of the plate 35 and the dock surface 13. The rear portions of the plate 35, however, are of sufficient dimensions due to the substantially lesser angular displacement, so that the edge 43 is disposed at an elevation slightly below the dock surface 13. Consequently, it will be seen that utilization of only the single plate 35 is insufficient to provide the necessary protection for assuring that a person will not be able to place his feet over the edge of the pit in alignment with the movement of the ramp 16 and which positioning could result in injury.

Mechanical coupling of the primary plate 35 with the ramp 16 is obtained by a support bracket 46 carried by the ramp and a stop lug 47 carried by the plate. The bracket 46 includes a vertically extending leg 48 secured to an element of the ramp's structural frame 20 and which extend a distance downwardly therefrom at the front of the frame. Formed with the leg 48 at the lower end thereof is a horizontally extending leg 49 that projects a distance rearwardly in parallel relationship to the outwardly facing surface of the plate. The stop lug 47 is secured to the plate 35 on the outwardly facing surface thereof and a position to be above the horizontal leg 49 of the support bracket and is of a thickness to engage the bracket leg 49 thereby coupling the plate to the ramp for selective movement. Relative vertical positions of the bracket and lug are selected so that, when the ramp 16 is in the horizontal position shown in FIG. 3, the plate 35 will be supported by its upper flange 41 resting on the angle member 32 and the stop lug 47 will not be supported on the bracket leg 49. Upward pivoting of the ramp 16, however, will swing the bracket leg 49 into contacting engagement with the stop lug 47 thereby swinging the plate 35 upwardly with the ramp. Upon downward pivoting of the ramp, the bracket leg 49 disengages from lug 47 as the ramp reaches the illustrated horizontal position or continues its downward movement to a downwardly inclined position. The plate 35 is again supported by interengagement of the plate flange 41 with the respective protective angle member 32.

To provide substantially greater protection, the toe guard 34 of this invention includes the second elongated plate 36 which is mounted in telescopic relationship to the primary plate 35. The plate 36 is of a generally triangular shape having a bottom edge 50 that extends in a substantially horizontal direction and a vertically extending, forward edge 51. An upper edge 52 extends in a relatively convergent relationship to the bottom edge 50 terminating in a squared apex or rear edge 53. A hinge pivot 54 is also provided interconnecting the two plates 35 and 36 for swinging movement and thus provides for the telescoping action. The hinge pivot extends through the plate 36 near the narrow end thereof and also extends through the primary plate 35 closely adjacent to the juncture 45 of the two edges 42 and 43. Formed with the bottom edge 50 of the secondary plate 36 is a laterally projecting flange 55 which extends in a direction to underlie the edges 42 and 43 of the other plate. The flange 55 cooperates with and interengages with the edge portion 43 of the primary plate to limit the relative rotation of the two plates in expanding to their fully extended position as shown in FIG. 2.

As the ramp 16 swings upwardly from the illustrated horizontal position shown in FIG. 3, the primary plate 35 will be swung upwardly when the ramp frame 20 has pivoted to an upwardly inclined position where the bracket 46 and lug 47 engage and will thus swing the plate 35 in conjunction with the ramp. During this upward swinging movement, the secondary plate 36 merely pivots about the hinge 54 with the end of the flange 55 riding on wear plate 56 secured to the pit bottom surface 29. When the ramp 20 has further progressed to an upwardly inclined position, as indicated in FIG. 2, the flange 55 formed on the bottom edge 50 of the secondary plate 36 will interengage with the edge portion 43 and thus restrict the two plates from further relative swinging movement as they will then be in their fully expanded or extended position. Further upward swinging movement of the ramp 16 will then carry both the plates to this further position which, in accordance with design of the dock board, will not exceed a point at which the extended toe guard plates 35 and 36 will completely fill the space between the structural frame 20 of the ramp and the upper surface 13 of the dock 12.

Upon descent of the ramp 16 to either the horizontal or a downwardly inclined position, the plate 36 will first engage the wear plate 56 located and positioned on the bottom surface 29 of the pit 11. This will occur at a position where the ramp is intermediately angled to FIGS. 2 and 3 and upon further descent of the ramp, the plate 36 will then have its flange 55 disengaged from the edge portion 43 and will then pivot with respect to the plate 35. Ultimately, as the ramp 16 descends to the horizontal position of FIG. 3, the plate 36 will be supported at one end on the wear plate 56 on bottom surface 29 of the pit and by the hinge pivot 54 and the upper flange 41 of the primary plate 35 will be in contacting engagement with the horizontal flange 32b of the protective angle members 32. At this point, the toe guard 34 will be restricted from further movement in cooperation with further descent of the ramp 16. Further descent of the ramp 16 will only result in disengagement of the support bracket 46 from the stop lug 47 as between the plate 35 and the ramp frame 20 and enable the ramp to descend to the illustrated position shown in broken lines in FIG. 5.

It will be readily apparent from the foregoing detailed description of the illustrative embodiment that a particularly advantageous telescopic toe guard is provided for a dock board. This telescopic toe guard includes the two relatively pivotable plates which can be telescoped into a relatively compact, parallel configuration to minimize the space required for storage when the dock board is in a depressed or in a normal horizontal position. However, the combination of the two relatively pivoted plates of the toe guard enable the toe guard to effectively block or close the space that would otherwise be open beneath the structural frame of the ramp and the surface of the dock. The telescopic toe guard plates enable the ramp to be pivoted through the entire extent of upward swinging movement that is required to cause positioning of the extendible lip to the horizontally projecting position as is required to permit its operation in the normal functioning of a dock board of this type. The provision of the telescopic toe guard eliminates the possibility of a person standing adjacent to the dock board and operating the dock board to inadvertently position his feet in that space through which the dock board may ultimately travel and thus prevent or materially reduce the likelihood of injury. Installation or mounting of the toe guard so as to be protected from damage by its recessed relationship to the dock surface assures reliably continuous operability even though equipment such as forklifts will be driven across the toe guard.

Having thus described this invention, what is claimed is:

1. In combination with a dockboard including a ramp having longitudinal sides and mounted on a pivot for swinging movement about an axis transverse to the sides in a vertical direction from a generally horizontal position to relatively elevated and a relatively depressed position; a toe guard comprising a first elongated plate disposed in a vertical plane closely adjacent to and extending substantially the length of the side of the ramp, said first plate mounted at one end on a pivot disposed adjacent the ramp pivot for relative swinging movement in a generally vertical plane, mechanical coupling means carried by said ramp and said first plate in relatively remote relationship to the respective pivot axis thereof, said coupling means operative on pivoting of the ramp to an elevated position to interconnect said first plate with said ramp for upward swinging thereof in conjunction with the ramp and to disconnect therefrom upon pivoting of the ramp to a relatively depressed position, a second elongated plate disposed in coplanar relationship to said first plate and mounted on a pivot carried by said first plate for relative pivoting movement of said second plate in coplanar relationship to said first plate between a relatively telescoped position and an expanded position, second mechanical coupling means carried by said first and second elongated plates for limiting relative rotational movement toward an expanded position, said second coupling means operative on pivoting of said first and second plates to said expanded position to interconnect said plates and to pivot said second plate in conjunction with said first plate, and second means engageable with said first and second plates on downward swinging movement thereof to support said first plate in a predetermined position and to pivot said second plate into telescoped relationship thereto.

2. In combination with a dockboard incluidng a ramp having longitudinal sides and mounted on a pivot for swinging movement about an axis transverse to the sides in a vertical direction from a generally horizontal position to relatively elevated and a relatively depressed position; a toe guard comprising a first elongated plate disposed in a vertical plane closely adjacent to and extending substantially the length of the side of the ramp, said first plate mounted at one end on a pivot disposed adjacent the ramp pivot for relative swinging movement in a generally vertical plane, mechanical coupling means carried by said ramp and said first plate in relatively remote relationship to the respective pivot axis thereof, said coupling means operative on pivoting of the ramp to an elevated position to interconnect said first plate with said ramp for upward swinging thereof in conjunction with the ramp and to disconnect therefrom upon pivoting of the ramp to a relatively depressed position, a second elongated plate disposed in coplanar relationship to said first plate and mounted on a pivot carried by said first plate for relative pivoting movement of said second plate in coplanar relationship to said first plate between a relatively telescoped position and an expanded position, second mechanical coupling means carried by said first and second elongated plates for limiting relative rotational movement toward an expanded position, said second coupling means operative on pivoting of said first and second plates to said expanded position to interconnect said plates and to pivot said second plate in conjunction with said first plate, and support means engageable with said first and second plates on downward swinging movement thereof to support said first plate in a predetermined position and to pivot said second plate into telescoped relationship thereto wherein said first plate, at the end opposite its pivot, has a vertical dimension substantially equal to the height of the dockboard and said second plate is pivoted to said first plate and adjacent a bottom edge thereof.

3. The combination of claim 2 wherein said first plate has a bottom longitudinally extending edge including a first portion extending rearwardly from the end opposite its pivot to the pivot for said second plate, and a second portion extending rearwardly from said pivot to its pivoted end, said first lower edge portion being generally horizontal when said first plate is supported in a horizontal position, said second portion extending in upwardly inclined relationship thereto so as to be generally horizontal when said first plate is provided to its maximum elevated position.

4. The combination of claim 3 wherein said second plate extends a distance rearwardly from its pivot mount on said first plate and has a bottom longitudinally extending edge which is generally horizontal when said first plate is supported in a horizontal position, and said second coupling means including a flange formed with said second plate along its bottom edge for at least the portion thereof extending rearwardly from its pivot mount, said flange projecting a distance laterally therefrom in a direction to underlie said first plate and to contactingly engage the second portion of its bottom edge when said first plate is pivoted to an elevated position.

5. The combination of claim 2 wherein said second means includes a stop plate supported in fixed relationship to the dockboard to contactingly engage said second plate at its forward end to limit downward movement thereof.

6. The combination of claim 2 wherein said second means includes a laterally projecting flange formed with said first plate and a support plate mounted at a fixed elevation to engage said flange and support said first plate in a generally horizontal position.

7. The combination of claim 6 wherein said flange extends a distance outwardly from the plate and away from the ramp, and said support means includes a fixed support disposed adjacent the longitudinal side of the ramp.

8. The combination of claim 2 wherein said second means includes a support bracket mounted on the ramp and a stop lug mounted on said first plate, said bracket and lug engageable on upward pivoting of the ramp from a horizontal position.

9. In combination with a dockboard including a ramp having longitudinal sides and mounted on a pivot for swinging movement about an axis transverse to the sides in a vertical direction from a generally horizontal position to relatively elevated and a relatively depressed position; a toe guard comprising a first elongated plate disposed in a vertical plane closely adjacent to and extending substantially the length of the side of the ramp, said first plate mounted at one end on a pivot disposed adjacent the ramp pivot for relative swinging movement in a generally vertical plane, mechanical coupling means carried by said ramp and said first plate in relatively remote relationship to the respective pivot axis thereof, said coupling means operative on pivoting of the ramp to an elevated position to interconnect said first plate with said ramp for upward swinging thereof in conjunction with the ramp and to disconnect therefrom upon pivoting of the ramp to a relatively depressed position, a second elongated plate disposed in coplanar relationship to said first plate and mounted on a pivot carried by said first plate for relative pivoting movement of said second plate in coplanar relationship to said first plate between a relatively telescoped position and an expanded position, second mechanical coupling means carried by said first and second elongated plates for limiting relative rotational movement toward an expanded position, said second coupling means operative on pivoting of said first and second plates to said expanded position to interconnect said plates and to pivot said second plate in conjunction with said first plate, and support means engageable with said first and second plates on downward swinging movement thereof to support said first plate in a predetermined position and to pivot said second plate into telescoped relationship thereto including a loading dock having a pit in which said dockboard is mounted and an upper surface that is contiguous with the ramp is in a generally horizontal position.

10. The combination of claim 9 wherein said second means includes a laterally projecting flange formed with said first plate and extending a distance laterally outward with respect to the ramp, and a support plate carried by the dock along the edge of the pit adjacent the longitudinal side of the ramp to underlie said flange.

11. The combination of claim 10 wherein said second means is disposed in recessed relationship to an upper surface of the dock to receive and support said laterally projecting flange in a manner preventing projection of any components of said toe guard above the dock surface when said flange is in contacting engagement with said support plate.

* * * * *

UNITED STATES PATENT AND TRADEMARK OFFICE
CERTIFICATE OF CORRECTION

PATENT NO. : 4,118,817
DATED : October 10, 1978
INVENTOR(S) : Peter B. Burnham

It is certified that error appears in the above-identified patent and that said Letters Patent are hereby corrected as shown below:

In the Title "TOW" should read --TOE--.

Column 1, line 1, "TOW" should read --TOE--.

Claim 3, line 27, "provided" should read --pivoted--.

Signed and Sealed this

*Thirteenth* Day of *March 1979*

[SEAL]

Attest:

RUTH C. MASON
*Attesting Officer*

DONALD W. BANNER
*Commissioner of Patents and Trademarks*